(12) United States Patent
Okumura

(10) Patent No.: US 9,495,602 B2
(45) Date of Patent: Nov. 15, 2016

(54) IMAGE AND MAP-BASED DETECTION OF VEHICLES AT INTERSECTIONS

(71) Applicant: Toyota Motor Engineering & Manufacturing North America, Inc., Erlanger, KY (US)

(72) Inventor: Bunyo Okumura, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 244 days.

(21) Appl. No.: 14/061,166

(22) Filed: Oct. 23, 2013

(65) Prior Publication Data

US 2015/0110344 A1    Apr. 23, 2015

(51) Int. Cl.
*G06K 9/32* (2006.01)
*G06K 9/00* (2006.01)

(52) U.S. Cl.
CPC ....... *G06K 9/00798* (2013.01); *G06K 9/00624* (2013.01)

(58) Field of Classification Search
None
See application file for complete search history.

(56) References Cited

U.S. PATENT DOCUMENTS

| | | | | |
|---|---|---|---|---|
| 5,555,555 | A * | 9/1996 | Sato | G06K 9/4633 382/104 |
| 8,134,480 | B2 | 3/2012 | Onome | |
| 8,254,670 | B2 | 8/2012 | Prokhorov | |
| 8,311,274 | B2 | 11/2012 | Bergmann et al. | |
| 8,718,861 | B1 * | 5/2014 | Montemerlo | B60W 30/00 701/26 |
| 2006/0025918 | A1 * | 2/2006 | Saeki | B60K 31/0008 701/96 |
| 2008/0273752 | A1 * | 11/2008 | Zhu | B60W 40/02 382/103 |
| 2009/0157268 | A1 * | 6/2009 | Chiba | G08G 1/168 701/53 |
| 2010/0061591 | A1 * | 3/2010 | Okada | G01C 7/04 382/103 |
| 2010/0271480 | A1 * | 10/2010 | Bezborodko | G07C 5/0891 348/148 |
| 2010/0315217 | A1 * | 12/2010 | Miura | B60W 30/18009 340/436 |
| 2010/0332127 | A1 * | 12/2010 | Imai | B60W 30/12 701/532 |
| 2012/0170812 | A1 * | 7/2012 | Kamiyama | B60R 1/00 382/103 |
| 2012/0310516 | A1 | 12/2012 | Zeng | |
| 2013/0158800 | A1 | 6/2013 | Trageser | |
| 2013/0242102 | A1 * | 9/2013 | Tsuchiya | G08G 1/166 348/148 |

OTHER PUBLICATIONS

Nedevschi et al., "Intersection Representation Enhancement by Sensorial Data and Digital Map Alignment" Aug. 2010.
Nedevschi et al, "Accurate Ego-Vehicle Global Localization at Intersections Through Alignment of Visual Data with Digital Map" Jun. 2013.

(Continued)

*Primary Examiner* — Siamak Harandi
*Assistant Examiner* — Mai Tran
(74) *Attorney, Agent, or Firm* — Christopher G. Darrow; Darrow Mustafa PC

(57) ABSTRACT

A system, device, and methods for image and map-based detection of vehicles at intersections. Once example computer-implemented method for detecting objects includes receiving, from the one or more sensors disposed on a vehicle, image data representative of an image and detecting an object on the image. The method further includes identifying a path extending from the vehicle to the detected object on the image and retrieving map data including lane information. The method further includes comparing the path to a representation of the lane information and determining the position of the detected object based on a comparison of the path, representation of the lane information, and the image.

18 Claims, 6 Drawing Sheets

(56) References Cited

OTHER PUBLICATIONS

Caraffi et al, "A System for Real-time Detection and Tracking of Vehicles from a Single Car-mounted Camera" pp. 975-982, ITSC 2012.

Machida et al., "GPU & CPU cooperative accelerated pedestrian and vehicle detection" pp. 506-513, ICCV Workshop 2011.

Co-pending U.S. Appl. No. 13/556,802, filed Jul. 24, 2012 to Joshi, et al.

* cited by examiner

IMAGE AND MAP-BASED DETECTION OF VEHICLES AT INTERSECTIONS

BACKGROUND

Fully automated driving systems are designed to operate a vehicle on the road without driver interaction or other external control, for example, in self-driving or autonomous vehicles. Autonomous vehicle operation requires certainty in the position and velocity of both the autonomous vehicle and objects proximate to the autonomous vehicle such as other vehicles in the surrounding environment. Existing methods of object detection and tracking to calculate the position and velocity of other vehicles in reference to the autonomous vehicle, based, for example, on processing of camera images, lidar or radar return data, or other sensor-based data, do not have the range, processing speed, or high-level accuracy necessary to operate an autonomous vehicle at an intersection.

SUMMARY

A system, device, and methods for object detection are disclosed. The object detection system can combine robust detection algorithms, persistent tracking algorithms, and map data including lane information to accurately detect the position of an object, for example, a moving vehicle. The object detection system can calculate a path, or ray, between the autonomous vehicle and detected object using image data and project this path onto the map data to determine candidate positions for the detected object. The actual position of the detected object can then be calculated by projecting the candidate positions along the path back onto the image for comparison and determination of lowest error.

In one implementation, an object detection system is disclosed. The system includes one or more sensors disposed on a vehicle; and a computing device in communication with the one or more sensors. The computing device includes one or more processors for controlling the operations of the computing device and a memory for storing data and program instructions used by the one or more processors. The one or more processors are configured to execute instructions stored in the memory to: receive, from the one or more sensors, image data representative of an image; detect an object on the image; identify a path extending from the vehicle to the detected object on the image; retrieve map data including lane information; compare the path to a representation of the lane information; and determine the position of the detected object based on a comparison of the path and the image.

In another implementation, a computer-implemented method for autonomous navigation is disclosed. The method includes receiving, from one or more sensors disposed on a vehicle, image data representative of an image; detecting an object on the image; identifying a path extending from the vehicle to the detected object on the image; retrieving map data including lane information; comparing the path to a representation of the lane information; and determining the position of the detected object based on a comparison of the path and the image.

In another implementation, a computing device is disclosed. The computing device includes one or more processors for controlling the operations of the computing device and a memory for storing data and program instructions used by the one or more processors. The one or more processors are configured to execute instructions stored in the memory to receive, from one or more sensors disposed on a vehicle, image data representative of an image; detect an object on the image; identify a path extending from the vehicle to the detected object on the image; retrieve map data including lane information; compare the path to a representation of the lane information; and determine the position of the detected object based on a comparison of the path and the image.

BRIEF DESCRIPTION OF THE DRAWINGS

The description makes reference to the accompanying drawings wherein like reference numerals refer to like parts throughout the several views, and wherein.

DETAILED DESCRIPTION

An object detection system and methods and devices for implementing the system are described below. In a method of using the system, one or more sensors disposed on an autonomous vehicle can receive image data representative of an image, for example, of one side of an intersection of two or more roads. A computing device implementing the system can detect an object on the image, for example, a moving vehicle coming toward or moving away from the autonomous vehicle. The computing device can identify a path extending from the autonomous vehicle to the detected object on the image and retrieve map data including lane information, for example, representing the intersection at which the autonomous vehicle is located. The computing device can compare the path to a representation of the lane information, for example, to determine candidate positions for the detected object and can determine the actual position of the detected object based on a comparison of the path and the image.

Figure 1:
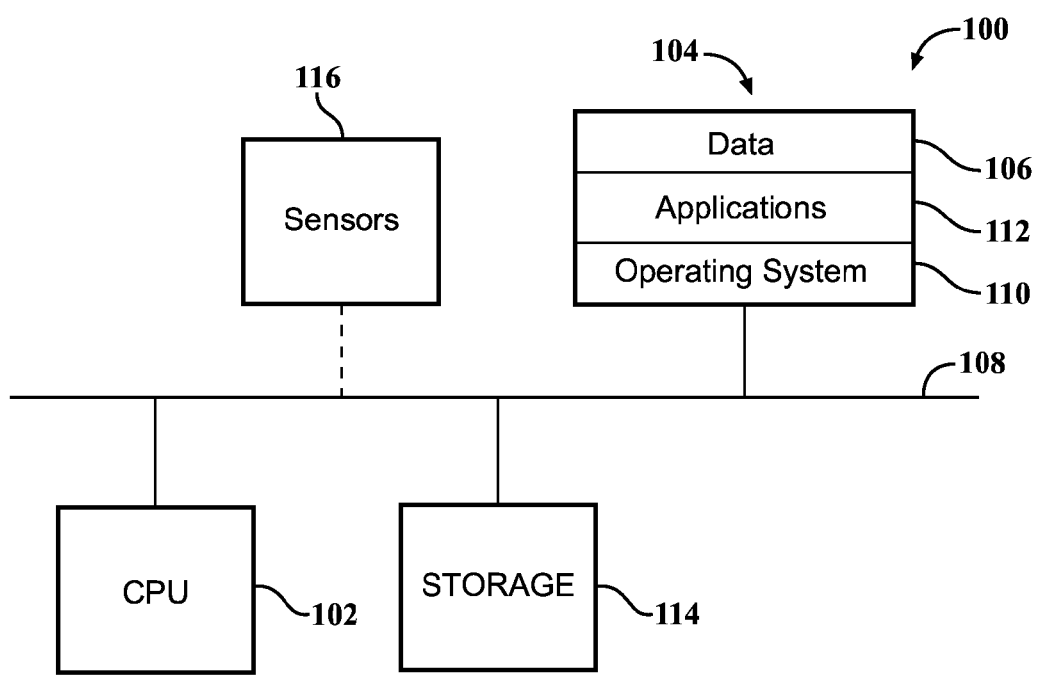
FIG. 1 is a block diagram of a computing device.

FIG. 1 is a block diagram of a computing device 100. The computing device 100 can be any type of vehicle-installed, handheld, desktop, or other form of single computing device, or can be composed of multiple computing devices. The CPU 102 in the computing device 100 can be a conventional central processing unit or any other type of device, or multiple devices, capable of manipulating or processing information. The memory 104 in the computing device 100 can be a random access memory device (RAM) or any other suitable type of storage device. The memory 104 can include data 106 that is accessed by the CPU 102 using a bus 108. The memory 104 can also include an operating system 110 and installed applications 112, the installed applications 112 including programs that permit the CPU 102 to perform the image and map-based detection methods described here.

The computing device 100 can also include secondary, additional, or external storage 114, for example, a memory card, flash drive, or any other form of computer readable medium. The installed applications 112 can be stored in whole or in part in the secondary storage 114 and loaded into the memory 104 as needed for processing. The computing device 100 can also be coupled to one or more sensors 116. The sensors 116 can receive, capture, or provide data and/or signals for processing by an inertial measurement unit (IMU), a dead-reckoning system, a global navigation satellite system (GNSS), a light detection and ranging (LIDAR) system, a radar system, a sonar system, an image sensor system, or any other type of system capable of capturing or detecting objects such as the autonomous vehicle, other vehicles, pedestrians, or other localized position data and/or signals and outputting corresponding data and/or signals to the CPU 102.

The sensors 116 can also capture data representative of changes in x, y, and z-axis position, velocity, acceleration, rotation angle, and rotational angular rate for the vehicle. If the sensors 116 capture data for a dead-reckoning system, data relating to wheel revolution speeds, travel distance, steering angle, and steering angular rate of change can be captured. If the sensors 116 capture signals for a GNSS, a receiver can calculate vehicle position and velocity estimated in global coordinates. A plurality of satellites can be used to estimate the autonomous vehicle's position and velocity using three-dimensional triangulation and time estimation. If the sensors 116 capture data for a LIDAR system, ranging data relating to intensity or reflectivity returns of the area surrounding the vehicle can be captured. If the sensors 116 capture images, for example, using monocular cameras, a time sequence of images can be captured and used to estimate the position and velocity of objects proximate to the autonomous vehicle.

In the examples described below, the sensors 116 can capture, at least: images of the environment surrounding the autonomous vehicle, data for a dead-reckoning system or other system that estimates vehicle velocity, acceleration, deceleration, position, and orientation; signals for a GNSS or other system that determines autonomous vehicle position and velocity; and data for a LIDAR system, radar system, or other system that measures vehicle distance from road lines (e.g., road surface markings or road boundaries), obstacles, other vehicles, or other environmental features including traffic lights and road signs.

Figure 2:
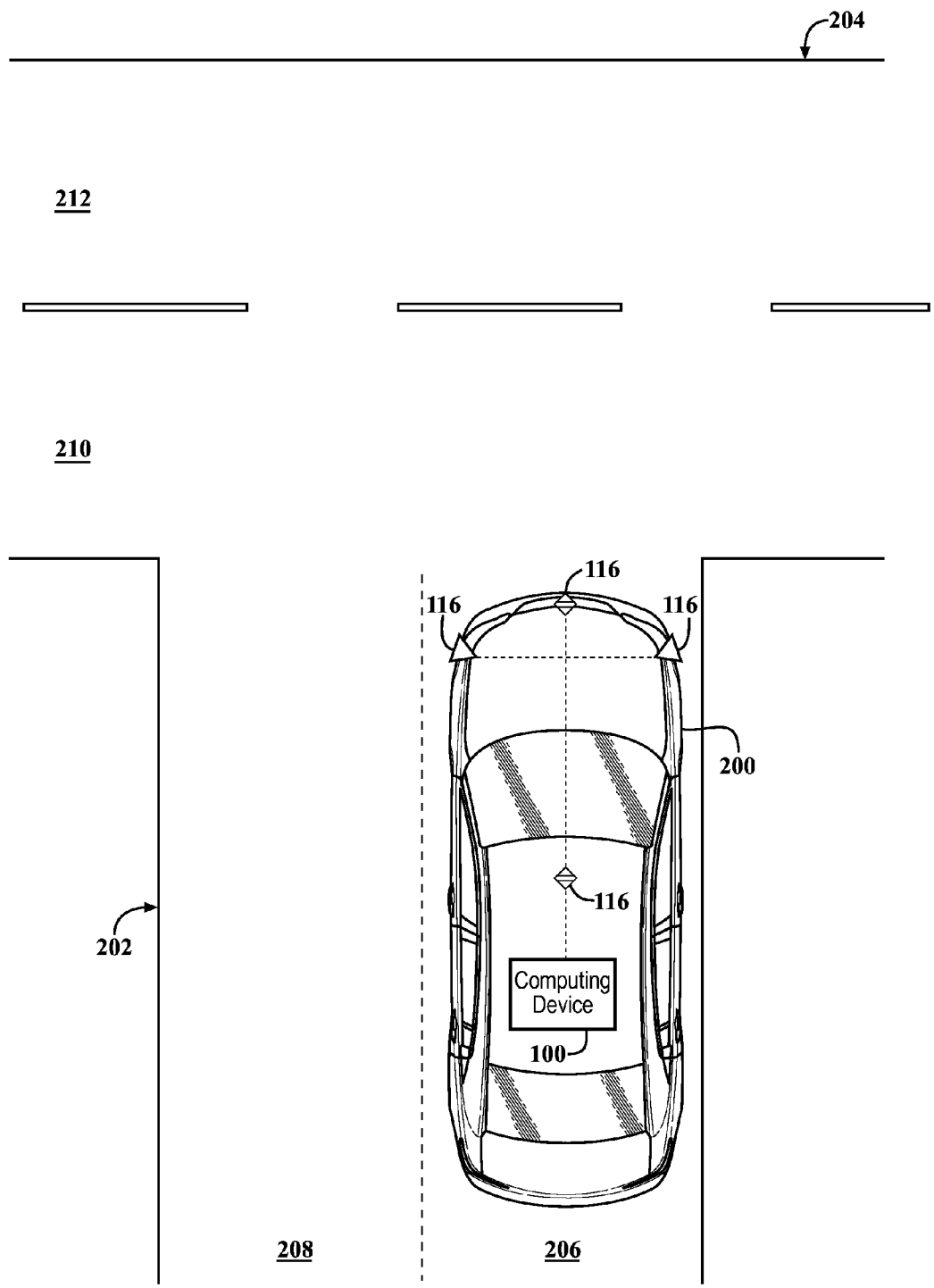
FIG. 2 shows a top-view representation of an autonomous vehicle at an example intersection including the computing device of FIG. 1.

FIG. 2 shows a top-view representation of an autonomous vehicle 200 at an example intersection including the computing device 100 of FIG. 1. The autonomous vehicle 200 is shown from above as being stopped at a 3-way intersection of two roads 202, 204. The road 202 that the autonomous vehicle 200 is currently traversing includes two lanes 206, 208. The intersecting road 204 also includes two lanes 210, 212. In this example, each of the lanes 206, 208, 210, 212 are identified by a dotted center line and a road edge of one of the roads 202, 204. Though a total of 4 lanes 206, 208, 210, 212 are present in the intersection of the roads 202, 204 shown in this example, the autonomous vehicle 200 may experience intersections with any possible number of lanes having any possible type of lane dividers.

The computing device 100 of FIG. 1 can be located within the autonomous vehicle 200 as shown in FIG. 2 or can be located remotely from the autonomous vehicle 200 in an alternate location (not shown). If the computing device 100 is remote, the autonomous vehicle 200 can include the capability of communicating with the computing device 100. The autonomous vehicle 200 can also include a plurality of sensors, such as the sensors 116 described in reference to FIG. 1. One or more of the sensors 116 shown can be configured to capture changes in velocity and acceleration, wheel revolution speed and distance for use by a Kalman filter to estimate position and orientation of the autonomous vehicle 200, steering angle for a dead-reckoning system, images for processing by an image sensor, vehicle position in global coordinates based on signals from a plurality of satellites, or any other data and/or signals that could be used to determine the velocity and position of both the autonomous vehicle 200 in respect to its environment and other objects or other vehicles in the environment with respect to the autonomous vehicle 200.

Figure 3:
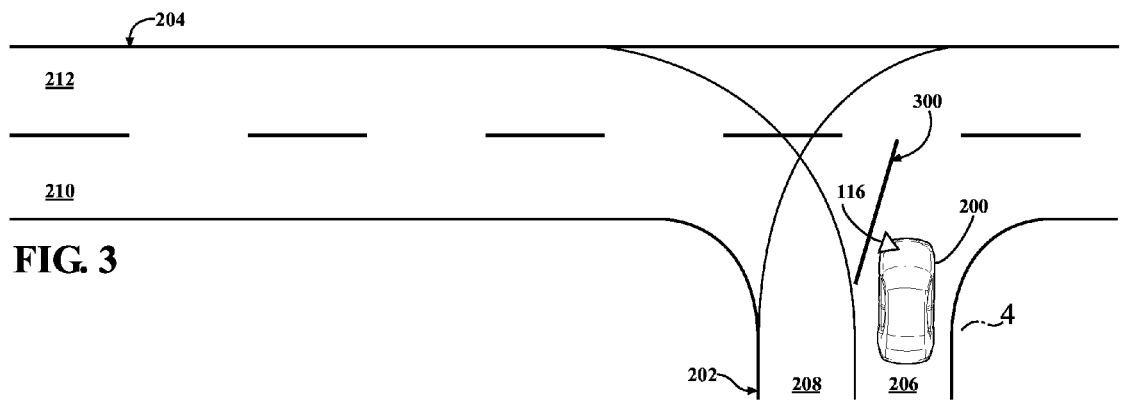
FIG. 3 shows an example map representation of the autonomous vehicle and intersection of FIG. 2.

FIG. 3 shows an example map representation of the autonomous vehicle 200 and intersection of FIG. 2. The map representation can be based on map data accessed by the computing device 100, the map data including lane information, such as number of lanes, location of lanes, direction of lanes, width of lanes, etc. One example source of map data is the publicly available Route Network Definition File (RNDF), but other sources of map data can be used to generate the map representation, for example, a lane network graph or OpenStreetMap™. The portion of the map data used for the map representation can be chosen based on the position of the autonomous vehicle 200, for example, determined using the GNSS or other sensors 116. The position of the autonomous vehicle 200 as calculated by the GNSS or other sensors 116 is also shown on the map representation.

This example map representation shows the autonomous vehicle 200 as present in lane 206 at the intersection of roads 202 and 204 as described in FIG. 2. The lanes 206, 208, 210, 212 are two-dimensional representations of the actual, physical lanes of the roads proximate to the position of the autonomous vehicle 200. In addition, the map representation includes indications for turning paths that vehicles within the lanes 206, 208, 210, 212 could follow when traveling, for example, from lane 206 to lane 212, from lane 212 to lane 208, from lane 210 to lane 208, etc. The map representation of FIG. 3 can be used in conjunction with an image 300 captured by one or more of the sensors 116 to limit the amount of processing needed to perform the various methods described in this disclosure as described in respect to FIG. 4.

Figure 4:
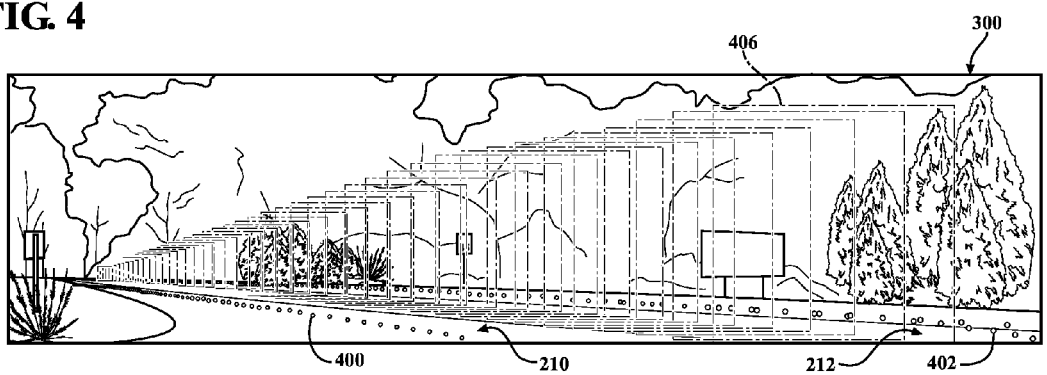
FIG. 4 shows a projection of the map representation of FIG. 3 onto an example image of one side of the intersection of FIG. 2.

FIG. 4 shows a projection of the map representation of FIG. 3 onto the image 300 of one side of the intersection of FIG. 2. The image 300, in this example, of the left side of the intersection of lanes 206, 208, 210, 212 can be captured by a camera, one of the sensors 116 disposed on the autonomous vehicle 200. The location where the image 300 was captured is represented in the map data of FIG. 3 while the image 300 is shown in FIG. 4. Using the map data, representations of the lanes 210, 212 in reference to the autonomous vehicle 200 are projected onto the image 300, shown as dotted lines 400, 402. That is, lane 210 is represented by dotted line 400 and lane 212 is represented by dotted line 402.

Once the lanes 210, 212 are projected onto the image 300 in the form of the dotted lines 400, 402, bounding boxes, such as bounding box 406, can be constructed along the lanes 210, 212. The bounding boxes represent the area in which an object is likely to be present along the lanes 210, 212. The bounding boxes can be constructed to include a predetermined safety factor designed to account for detection of various sized-objects. As is shown in FIG. 4, the bounding boxes closest to the autonomous vehicle 200, at the lower right of the image 300, are largest, representing objects closest to the autonomous vehicle 200. The bounding boxes furthest from the autonomous vehicle 200, at the lower left of the image 300, are smallest, representing objects furthest from the autonomous vehicle 200 while still present in the image 300. Once projected onto the image 300, the bounding boxes can be used to define a region of interest on the image 300, that is, a region of the image 300 that can be analyzed to detect objects, for example, moving objects such as vehicles approaching or leaving the intersection. Object detection is further described in reference to FIG. 5.

Figure 5:
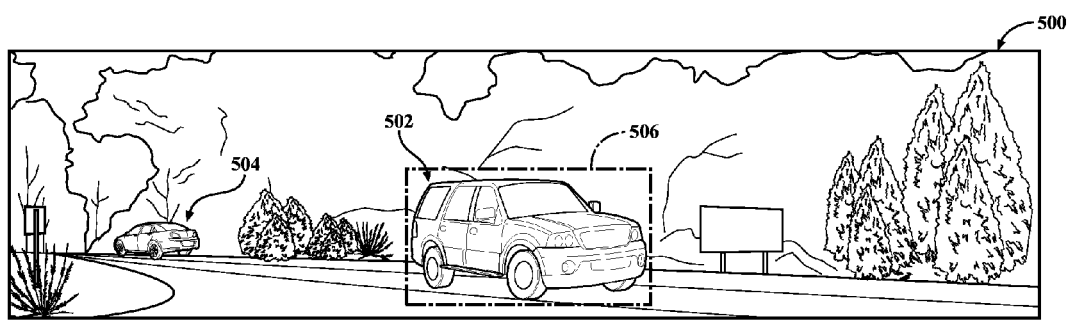
FIG. 5 shows another example image of one side of the intersection of FIGS. 2 and 3.

FIG. 5 shows another example image 500 of the left side of the intersection of FIGS. 2 and 3. Two objects relevant to the operation of the autonomous vehicle 200 can be visually detected in the image 500, moving vehicle 502 and moving vehicle 504. Moving vehicle 502 is coming toward the intersection of FIGS. 2 and 3, likely within lane 210, and moving vehicle 504 is moving away from the intersection of FIGS. 2 and 3, likely in lane 212. In order to use this image 500 for autonomous navigation, the moving vehicles 502, 504, and any other relevant objects, will need to be detected by the computing device 100.

Various types of object detection can be used to process the image 500. The amount of processing needed to detect objects can be reduced by processing only a region of interest in the image 500. The region of interest in image 500 can be determined in the same manner as discussed in reference to FIG. 4 and image 300. Once the region of interest is determined, a detection algorithm, for example, a cascaded detector with a sliding window technique implemented using a Graphics Processing Unit (GPU), can be used to quickly detect objects within the image 500. In one example cascaded detector, object candidates are detected based on histograms of oriented gradients (HOG) in preliminary stages and interactions of possible combinations of HOG-based features in later stages. Using a region of interest in combination with the detection algorithm for object detection on the image 500 can reduce the computational time by up to two-thirds. In addition, the detection algorithm can be run, for example, on every two or three image frames instead of every frame to reduce computational time further. A fast computational time is desirable while operating the autonomous vehicle 200.

At least one result from the object detection algorithm performed by the computing device 100, position of the detected object, can be represented on the image 500 in the form of a bounding box 506. In the example in FIG. 5, bounding box 506 surrounds moving vehicle 502, indicating the position of the moving vehicle 502 on the image 500. In addition, the motion direction for the moving vehicle 502 can be determined based on visual attributes of the moving vehicle 502 on the image 500. For example, the presence of headlights, front grille, position of side mirrors, or other features present on the moving vehicle 502 can indicate that the motion direction of the moving vehicle 502 is such that the moving vehicle 502 is headed toward the autonomous vehicle 200 which captured the image 500.

Motion direction for a detected object can also be determined by comparing the position of the detected object, for example, the location of the bounding box 506 surrounding the moving vehicle 502, in two or more time-sequenced images. The direction in which the bounding box 506 moves between the time-sequenced images can indicate the motion direction of the moving vehicle 502. Similarly, velocity for the detected object can be determined based on a comparison of the position of the detected object in two or more time-sequenced images. Understanding the motion direction and velocity of a detected object, such as moving vehicle 502, is useful in tracking the detected object as it moves in reference to the autonomous vehicle 200.

Determining the position, direction, and velocity of a moving object can all be part of a persistent tracking scheme. The persistent tracking scheme can also include adaptively switching between multiple tracking algorithms, for example, algorithms such as the "flock of trackers" algorithm and the "learn and re-detect" algorithm. Switching between tracking algorithms can improve tracking performance and reduce overall computational cost of persistent tracking. Further improvements to object detection and tracking accuracy are described in respect to FIGS. 6 and 7.

Figure 6:
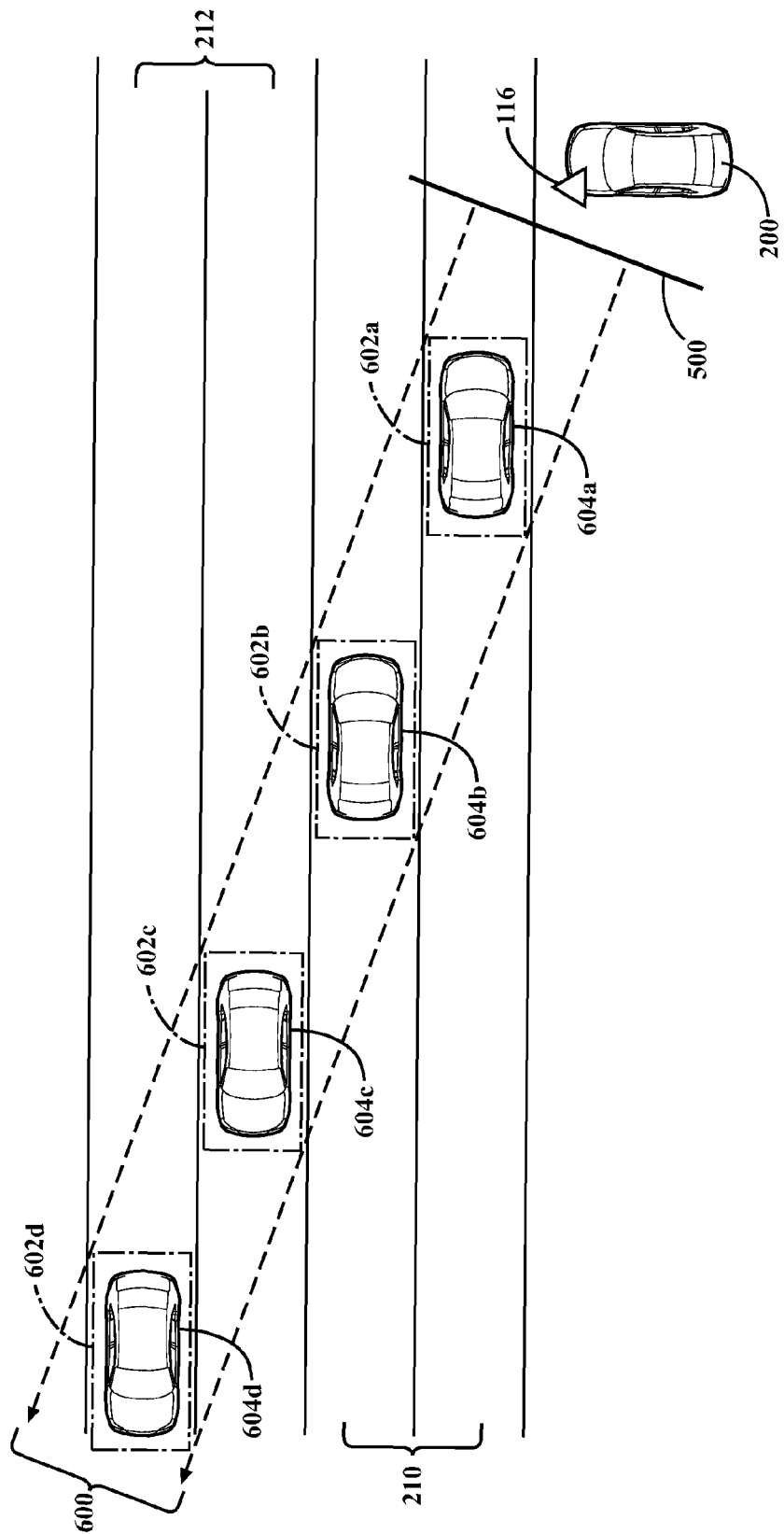
FIG. 6 shows a projection of a path 600 extending from the autonomous vehicle 200 to a detected object onto another example map representation of the intersection of FIGS. 2 and 3.

FIG. 6 shows a projection of a path 600 extending from the autonomous vehicle 200 to a detected object onto another example map representation of the intersection of FIGS. 2 and 3. The map representation in FIG. 6 is a partial top view of the intersection of FIGS. 2 and 3 can be based on map data retrieved by the computing device 100 including, at least, lane information specific to the intersection proximate to the autonomous vehicle 200. In this example map representation, the lanes 210, 212 are each represented in two segments, or halves, to account for numerous potential locations of a detected object within the lanes 210, 212. The number of lane segments can vary, and the map representation can also include segments between or outside of the lanes 210, 212 to account for various potential detected object positions.

The path 600 is generated based on the position of a detected object in respect to the autonomous vehicle 200 on a representative image. In this example, the path 600 is based on the location of bounding box 506 in respect to the sensor 116 capturing the image 500 from the autonomous vehicle 200. The path 600 is projected onto the map representation, and once projected, can be compared to the lane information present in the map representation, for example, to determine one or more candidate positions for the detected object on the image 500. Each of the candidate positions of the detected object can be estimated as two-dimensional vectors in the world coordinate system.

In the example of FIG. 6, four candidate positions 602*a-d* are shown based on the projection of the path 600 onto the lanes 210, 212. Each of the candidate positions 602*a-d* is shown in one of the represented lane segments of lanes 210, 212. The candidate positions 602*a-d* can be located between intersecting areas of the lane information and the path. The intersecting areas can, for example, be where the boundaries of the lane segments and the boundaries of the path 600 intersect. The boundaries of the path are shown in dotted line arrows projecting from the image 500 and the boundaries of the lane segments are shown in solid lines making up the lanes 210, 212.

The candidate positions 602*a-d* can also include a representation of motion direction, for example, directional orientation information. In the example map representation of FIG. 6, the two candidate positions 602*a,b* in the segments of lane 210 include directional indicators 604*a,b*. The directional indicators 604*a, b* show a pointed edge directed toward the autonomous vehicle 200, indicating that the detected object represented by these candidate positions 602*a-b* heads toward the autonomous vehicle 200. Similarly, the two candidate positions 602*c, d* in the segments of lane 212 include directional indicators 604*c, d* indicating that the detected object heads away from the autonomous vehicle 200. The directional indicators 604a-d can be based on the lane information associated with the lanes 210, 212, the visual attributes of the detected object in the image 500, or other information generated using the detection and tracking algorithms described above. In this example, the directional indicators 604a-d are based on the lane information used to construct the map representation.

Both the directional indicators 604a-d and the candidate positions 602a-d along the path 600 are useful to determine the position of the detected object in respect to the autonomous vehicle 200. In this example, the detected object is the moving vehicle 502 as represented by the bounding box 506 on the image 500 in FIG. 5. Though the size of the bounding box 506 on the image 500 allows an approximate distance from the autonomous vehicle 200 to the moving vehicle 502 to be calculated, this distance is not of sufficient accuracy to determine the exact position of the detected object.

Figure 7:
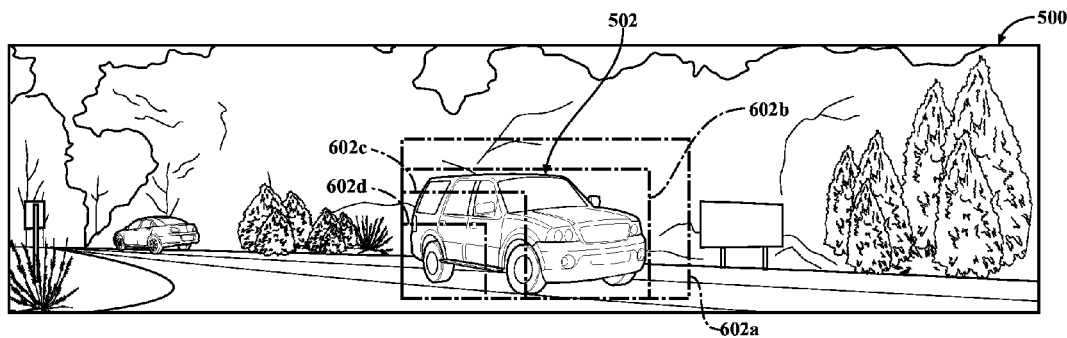
FIG. 7 shows a projection of candidate positions of a detected object from the map representation of FIG. 6 onto the image of FIG. 5.

FIG. 7 shows a projection of the candidate positions 602a-d of a detected object, in this example, the moving vehicle 502, from the map representation of FIG. 6 onto the image 500 of FIG. 5. In order to determine the proper size for each projection, the distance from the autonomous vehicle 200 to each candidate position 602a-d is calculated by the computing device 100 based on the location of each candidate position 602a-d on the map representation of the lanes 210, 212 in FIG. 6. The projection of the candidate positions 602a-d onto the image 500 takes this distance into account using the size of each of the candidate positions 602a-d. For example, the projection of the candidate position 602a appears largest on the image 500 and the projection of the candidate position 602d appears smallest on the image 500.

By comparing the projections of the candidate positions 602a-d to the image 500, the computing device can determine that candidate position 602b represents the most accurate position for the moving vehicle 502. Each of the other projections of the candidate positions 602a, 602c, 602d are smaller than the moving vehicle 502 or much larger than the moving vehicle 502, that is, the bounding boxes that represent the projections of the candidate positions 602a, 602c, 602d do not fit the detected moving vehicle 502. The determination of the position of the detected object can also be based on the motion direction of the detected object. By using either the visual attributes of the moving vehicle 502 on the image 500 or the directional indicators 604a-d along the projected path 600 on the map representation in FIG. 6, or both, the computing device 100 can determine that the detected object is moving toward the autonomous vehicle 200. Hence, the candidate positions 602c-d indicating that the detected object is moving away from the autonomous vehicle 200 can be eliminated as potential actual positions for the detected object before the final comparison of the path 600 and the image 500.

In determining which of the candidate positions 602a-d of the detected object is the actual position based on the comparison of the path 600 and the image 500, the computing device 100 can be configured to find the minimum of the error function for each of the various candidate positions 602a-d. The error function can, for example, be defined as follows:

$$E(p)=\alpha E_{Road}(p)+\beta E_{RayH}(p)+\gamma E_{RayV}(p)$$

$\alpha, \beta$, and $\gamma$=weights of errors $$E_{road}(p)=\min_{r \subset Road}(|p-r|)$$

$$E_{RayH}(p)=|p-c+(p*v)v|$$

$$E_{RayV}(p)=|p*v-d|$$

p=center of candidate position 602a-d
r=position of waypoint
c=principal point of sensor 116 (camera)
v=normalized direction of path 600
d=distance from camera to candidate position 602a-d In the above error function, a large value of α can provide a strong constraint to the shape of the road 204. In addition, the error function can have many local minima depending on the shape of the road 204 and the direction of the path 600. In determining the actual position of the detected object based on the candidate positions 602a-d, the direction of the path 600 proves more accurate than, for example, simply calculating the distance to the bounding box 506 in the captured image 500.

The object detection and tracking algorithm described in the above embodiments combines object detection, persistent tracking, and map data including lane information to determine the actual position of a detected object, for example, moving vehicle 502 in image 500 described in FIGS. 5 and 7, for use in autonomous navigation. Use of the computing device 100 resources can be optimized by limiting the processing of the image 500 to a region of interest when running the detection and tracking algorithm. The detection and tracking algorithm combines robust detection and persistent tracking to improve detection performance and lower computational cost.

Figure 8:
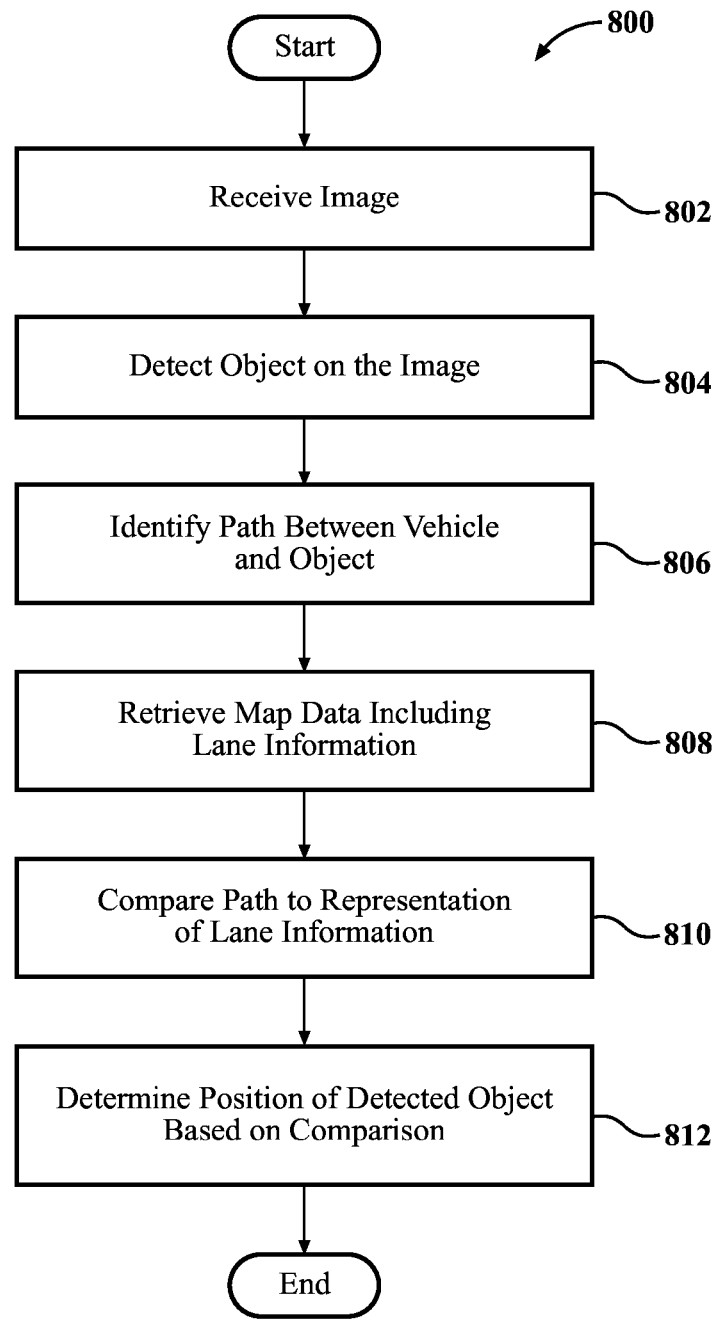
FIG. 8 shows a logic flowchart of a process performed by the computing device of FIG. 1.

FIG. 8 shows a logic flowchart of a process 800 performed by the computing device of FIG. 1. In step 802 of the process 800, the computing device 100 can receive image data representative of an image from one or more sensors. For example, images 300, 500 of FIGS. 4, 5, and 7 can be captured by a monocular camera serving as one of the sensors 116 disposed on the autonomous vehicle 200 of FIGS. 2, 3, and 6. The image data captured by the one or more sensors can be analyzed by the computing device 100 to detect an object on the image in step 804 of the process 800. The algorithm for detecting the object can include processing the image data using a cascaded detector as described previously in regards to FIG. 5. For example, moving vehicle 502 can be detected in image 500 and bounding box 506 can be associated with the moving vehicle 502 as representative of the position of the moving vehicle 502 on the image 500. The algorithm for detecting of the object can also be restricted to a region of interest within the image to limit the computational processing required as described in respect to FIG. 4.

In step 806 of the process 800, the computing device 100 can identify a path extending from the autonomous vehicle 200 to the detected object on the image. For example, path 600 can be calculated as extending from the position of the autonomous vehicle 200 to the position of the moving vehicle 502 in the two-dimensional coordinate space associated with the image 500 as represented in FIG. 5. In step 808 of the process 800, the computing device 100 can retrieve map data including lane information, such as the number of lanes and the direction of each lane. The map data can be retrieved, for example, from the memory 104 or storage 114 of the computing device 100, an external source of map data such as the RNDF, another lane network graph, or OpenStreetMap™.

In step 810 of the process 800, the computing device 100 can compare the path, e.g. path 600, to a representation of the lane information, e.g. the top-view of lanes 210, 212 of FIG. 6. Comparing the path to the representation of the lane information can include determining one or more candidate positions for the detected object on the image. For example, the locations of candidate positions 602a-d on the representation of the lane information in FIG. 6 are each configured to lie between intersecting areas of the lane information and the path 600, as the path 600 has been projected onto the lane information. In this example, the lanes 210, 212 each include two lane segments. The solid-line boundaries of the lane segments can intersect the dotted-line boundaries of the path 600 to form the intersecting areas. The candidate positions 602a-d lie between the intersecting areas, one in each lane segment.

In step 812 of the process 800, the computing device 100 can determine the position of the detected object based on a comparison of the path and the image. For example, each of the candidate positions 602a-d lying along the path 600 can be projected back onto the image 500. The size of each candidate position 602a-d can indicate the distance to each projected candidate position 602a-d from the autonomous vehicle 200. Determine which of the candidate positions 602a-d are the actual position of detected object includes, in this example, comparing the size of the candidate positions 602a-d to the moving vehicle 502 in the image 500 to find the lowest error match.

The actual position of the detected object can also be based on the motion direction of the detected object, determined based on at least one of visual attributes of the detected object on the image, e.g. image 500, and a comparison of the position of the detected object in two or more time-sequenced images. In addition to determining the actual position of detected objects using a comparison of a path to lane information to an image, the computing device 100 can also determine a velocity for the detected object based on a comparison of the position of the detected object in two or more time-sequenced images. After determining the actual position of the detected object, the process 800 ends.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An object detection system, comprising:
   one or more sensors disposed on a vehicle; and
   a computing device in communication with the one or more sensors, comprising:
      one or more processors for controlling operations of the computing device; and
      a memory for storing data and program instructions used by the one or more processors, wherein the one or more processors are configured to execute instructions stored in the memory to:
         receive, from the one or more sensors, image data of an external environment of the vehicle;
         detect an object in the external environment based on the image data;
         generate a bounding box surrounding the detected object;
         generate a path extending from the vehicle to the detected object, the path including the bounding box, the path being independent from an intended travel path of the vehicle;
         retrieve map data including lane information;
         compare the path to a representation of the lane information;
         determine a plurality of candidate positions for the detected object located between intersecting areas of the lane information and the path;
         project the plurality of candidate positions onto the image data; and
         determine a position of the detected object based on a comparison of the one or more candidate positions and the detected object in the image data.

2. The system of claim 1 wherein the size of each candidate position indicates the distance to each projected candidate position from the vehicle.

3. The system of claim 1 wherein the processors are further configured to determine a motion direction for the detected object based on at least one of visual attributes of the detected object on the image and a comparison of the position of the detected object in two or more time-sequenced images.

4. The system of claim 3 wherein determining the position of the detected object is further based on the motion direction of the detected object.

5. The system of claim 1 wherein the processors are further configured to determine a velocity for the detected object based on a comparison of the position of the detected object in two or more time-sequenced images.

6. The system of claim 1 wherein detecting the object includes comparing the map data to the image data to define a region of interest on the image and detection of the object occurs within the region of interest.

7. The system of claim 1, wherein detecting the object includes processing the image data using a cascaded detector.

8. The system of claim 1 wherein the lane information includes the number of lanes and the direction of each lane.

9. A computer-implemented method for detecting objects, comprising:
   receiving, from one or more sensors disposed on a vehicle, image data of an external environment of the vehicle;
   detecting an object in the external environment based on the image data;
   generating a path extending from the vehicle to the detected object, the path including the detected object, the path being independent from an intended travel path of the vehicle;
   retrieving map data including lane information;
   comparing the path to a representation of the lane information; and
   determining a position of the detected object based the comparison of the path to the representation of the lane information.

10. The method of claim 9 wherein the comparing of the path to the representation of the lane information includes determining one or more candidate positions for the detected object on the image.

11. The method of claim 10 wherein the one or more candidate positions are located between intersecting areas of the lane information and the path.

12. The method of claim 10 wherein the size of each candidate position indicates the distance to each projected candidate position from the vehicle.

13. The method of claim 9 wherein the processors are further configured to:
   determine a motion direction for the detected object;
   wherein the determination of the motion direction is based on at least one of visual attributes of the detected object on the image and a comparison of the position of the detected object in two or more time-sequenced images; and wherein determining the position of the detected object is further based on the motion direction of the detected object.

14. A computing device, comprising:
one or more processors for controlling the operations of the computing device; and
a memory for storing data and program instructions used by the one or more processors, wherein the one or more processors are configured to execute instructions stored in the memory to:
  receive, from one or more sensors disposed on a vehicle, image data of an external environment of the vehicle;
  detect an object in the external environment based on the image data;
  generate a path extending from the vehicle to the detected object, the path including the detected object, the path being independent from an intended travel path of the vehicle;
  retrieve map data including lane information;
  compare the path to a representation of the lane information; and
  determine a position of the detected object based on the comparison of the path to the representation of the lane information.

15. The computing device of claim 14 wherein the comparing of the path to the representation of the lane information includes determining one or more candidate positions for the detected object on the image.

16. The computing device of claim 15 wherein the one or more candidate positions are located between intersecting areas of the lane information and the path.

17. The computing device of claim 15 wherein the size of each candidate position indicates the distance to each projected candidate position from the vehicle.

18. The computing device of claim 14 wherein the processors are further configured to:
  determine a motion direction for the detected object;
  wherein the determination of the motion direction is based on at least one of visual attributes of the detected object on the image and a comparison of the position of the detected object in two or more time-sequenced images; and
  wherein determining the position of the detected object is further based on the motion direction of the detected object.

* * * * *